Nov. 1, 1966  E. C. SCHROM  3,283,294

APPARATUS FOR AN ELECTROHYDRAULIC SYSTEM

Filed March 31, 1965

Inventor:
Edward C. Schrom,
by Paul G. Frank
His Attorney.

United States Patent Office 3,283,294
Patented Nov. 1, 1966

3,283,294
APPARATUS FOR AN ELECTROHYDRAULIC
SYSTEM
Edward C. Schrom, Schenectady, N.Y., assignor to General Electric Company, a corporation of New York
Filed Mar. 31, 1965, Ser. No. 444,289
4 Claims. (Cl. 340—12)

My invention relates to an electrohydraulic shock wave emitter and, more particularly, to an electrode for such an emitter having apparatus associated therewith for directing and increasing the efficiency of shock wave transmission.

In the use of electrohydraulic shock wave generators as disclosed in copending applications Ser. No. 323,362, Schrom, "Electrode," Ser. No. 323,363, now Pat. No. 3,225,252, Schrom et al., "Electrohydraulic System and Working Fluids Therefor," and Ser. No. 323,361, now Pat. No. 3,234,429, Schrom, "Electrical Circuit for Electrohydraulic Systems," all of which are assigned to the assignee of the present invention and especially for such uses as geological exploration, as disclosed in application Ser. No. 444,250, "Electrohydraulic System for Geological Exploration," Matrone, also assigned to the assignee of the present invention, the need arises for a simple means of directing the emitted shock waves so that substantially all the emitted shock waves travel in a predesignated direction before radiating to thereby achieve increased effectiveness. It would also be most useful if means for containing a specific quantity of fluid, all of whose characteristics were known, could be combined with the electrode (shock wave emitter). Such a means would make the emitted shock waves more uniform and predictable, and any deviation from these predicted values would be more obvious. In the use of shock wave generators, especially in liquid filled shallow holes, a means of effectively sealing the hole to achieve maximum transmission of the shock waves by avoiding splashing of the water is necessary for highly efficient operation. With sealing means and fluid containing means, a means is also needed to replenish the supply of fluid in the fluid containing means and also exhaust the waste gases formed from shocking without adversely affecting the sealed condition of the hole. Therefore, a shock wave reflective shield having gas exhaust means in combination with a flexible fluid container, also acting as a sealing means, is needed for more efficient operation of an electrohydraulic shock wave generator.

The chief object of my invention is an improved shock wave generator having an attachment for directing shock waves.

Another object of my invention is the provision of a shock wave generator having fluid containing apparatus connected thereto for greater uniformity and predictability of the transmitted shock waves.

A further object of my invention is the provision of a shock wave generator for use in a fluid filled hole having means for sealing the hole for more effective shock wave transmittal.

A still further object of my invention is the provision of the shock wave generator as above having an arrangement for removing waste gases caused by the shocking without adversely affecting the sealed condition of the hole.

These and other objects of my invention will be more readily perceived from the description which follows:

In carrying out the objects of my invention, I provide a curved reflecting shield that is placed over a shock wave emitter to direct the shock waves downward into a hole in which the emitter is placed so that radiation takes place lower in the hole. A flexible diaphragm connected to the shield forms an enclosed container, surrounding the generator tip, which container is filled with a preselected fluid with known characteristics to make the shock waves more uniform and more predictable. This diaphragm also expands to seal the fluid filled hole for more effective transmission of the shock waves. Apertures within the shield are provided to circulate fluid into and out of the enclosed container and relieve waste gases caused by the shock waves which are formed therein, while maintaining the sealed condition of the hole.

Figure 1:
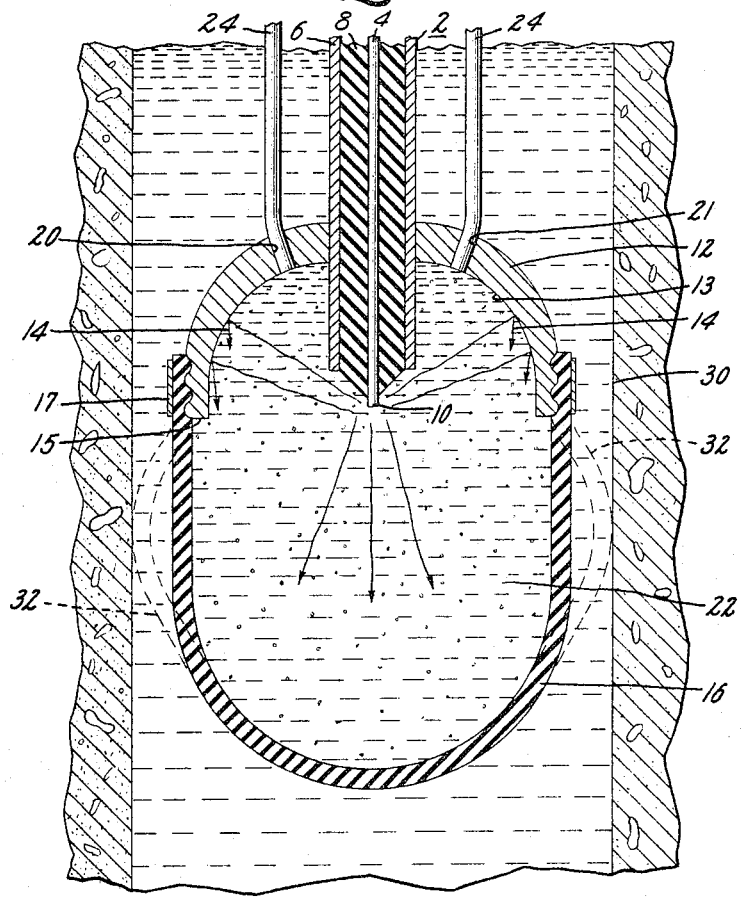
FIGURE 1 is a cross-sectional view of an electrode for an electrohydraulic system showing a reflecting shield and expandable fluid containing diaphragm attached thereto.

In FIGURE 1 the shock wave emitter having a reflecting means and sealing means in accordance with my invention is illustrated. The construction includes electrode or emitter 2 containing center conducting rod 4 surrounded by conducting sheath 6 with insulation material 8 placed therebetween, for bonding of sheath 6 to conducting rod 4. Operation of the electrode is in the same manner as previously described in Ser. No. 323,362 whereby a capacitor (not shown) discharges through conducting rod 4 to cause an electrical arcing between rod 4 and sheath 6 to thereby generate shock waves from tip 10 of electrode 2. Surrounding electrode 2 is reflecting shield 12 which is constructed of a suitable high strength metal, such as steel, and having an inner surface 13, which is shaped for proper deflection of shock waves, e.g., hemispherical as shown in FIGURE 1. Shock waves normally radiate in all directions from tip 10, but because of inner surface 13 of reflecting shield 12 the shock waves which are directed otherwise than downward impinge on reflecting shield 12 and are directed downward, as indicated by arrows 14, so that substantially all shock waves are effectively concentrated in a downward direction. As will be subsequently explained with respect to FIGURE 2 this principle becomes useful in many applications where it is desirable to have shock waves radiate at a distance from electrode tip 10 rather than exactly at the tip itself. Thus as indicated, the direction and the place from which the shock waves radiate can then be chosen with some accuracy. As aforementioned, reflecting surface 13 is constructed in a manner wherein the impinging shock waves are readily deflected with a minimum of energy loss. The most advantageous shapes for surface 13 are hemispherical, elliptical, conical and other geometrical shapes which have smooth even surfaces and avoid sharp edges. In the conical shape, electrode 2 passes through the apex of the cone so that symmetrical slanting sides form on each side of electrode 2.

Connected to reflecting shield 12 is a flexible diaphragm 16 constructed of a flexible plastic or rubber and being of sufficient tensile strength so that it readily returns to its former shape after expansion, with no residual effects. Also, its strength should be sufficient to withstand repetitive shocks from electrode 2 without sustaining any destruction or damage. Diaphragm 16 is clamped on or otherwise fastened to shield 12 so that a watertight fit is obtained and also so that it may readily be removed for servicing when desired. Split ring or other connector 17 may be provided for ease in securing diaphragm 16 to shield 12.

Apertures 20 and 21 project through shield 12 for admission and discharge of fluid into container space 22 formed between shield 12 and diaphragm 16. Tubes 24 or other means which project from both apertures 20 and 21 for conveying fluid into and out of container 22, are preferably flexible so that shock waves have no detrimental effect thereon.

In operation, shock waves are emitted at tip 10 of emitter 2 by an electrical discharge between conducting rod 4 and sheath 6. The shock waves being to radiate in all directions from tip 10, but those that travel in an upward or horizontal direction, as indicated by arrows 14 impinge on shield 12 and are deflected by inner surface 13 thereof so that they then travel in a downward direction. Shield 12 is positioned in a manner whereby its bottom edge 15 is below the level of tip 10 so that shock waves that travel in a direction other than downward are deflected into this downward direction. Shield 12, of course, can be adjusted to alter its deflection characteristics by changing its position with respect to electrode 2. Thus, shock waves can be directed in substantially any direction desired. Before the shock waves are emitted and during the shocking process, fluid is pumped into chamber 22 through opening 20 in shield 12. Fluid as discussed in application S.N. 323,363 is a working fluid which has known characteristics and readily transmits shock waves therethrough in a uniform manner with a minimum of distortion. Water has been found to be an excellent fluid for this purpose. Alternatively, additives as pointed out in the aforementioned application are added to the water to increase both the efficiency of the discharged shock wave and the efficiency of transmission of the shock waves through the water. By having a known volume of a fluid whose characteristics, i.e., density and viscosity, are known in direct contact with the electrode by the use of diaphragm 16, the shock waves transmitted must all pass through this fluid and are therefore substantially uniform in intensity. Therefore, the shock waves received should be substantially identical and slight deviations from these predictable values are readily apparent and are probably due to the earth strata and not imperfections in the transmission equipment. Working fluid is circulated out of container 22 through passage 21 in shield 12 by means of a pump (not shown) or other fluid moving means. Fluid is then constantly circulated through container 22 so that a fresh supply is always kept in contact with working tip 10 for maximum effectiveness. Exit port 21 in shield 12 is also useful in exhausting waste gases caused by dissipation of gas from the liquid by the arcing due to shocking; gases which would seriously decrease the efficiency of electrode 2 if permitted to remain within chamber 22.

Diaphragm 16 also acts effectively to seal hole 30 into which the shock wave emitter is placed. By being flexible diaphragm 16 expands as shown by dotted lines 32 when pressure is applied thereto so that the bottom of diaphragm 16 forms a solid surface across shaft 30. By thus sealing shaft 30, the liquid therein acts as a resonant tube more effectively to transmit the shock waves emitted by electrode 2, and thereby a rather small hole may be employed without danger of splashing or other detrimental side effects which impair shock wave transmission and are normally caused by unrestrained liquid within a shallow hole. It is noted that hole 30 is completely sealed and remains sealed by diaphragm 15 without the need to puncture that seal for insertion of electrode 2 or for pumping fluid into and out of container 22.

Figure 2:
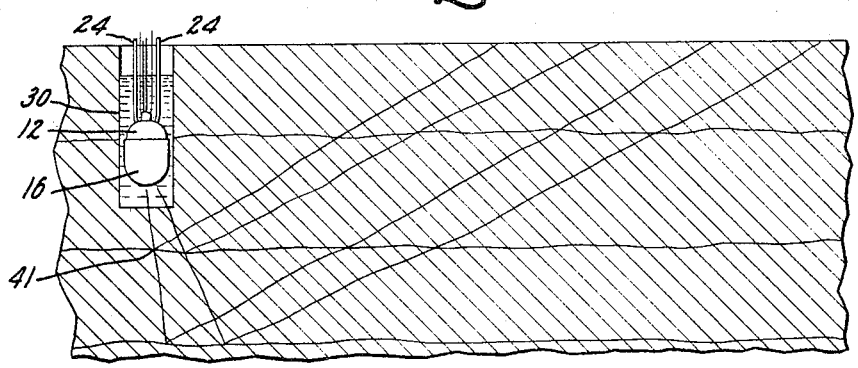
FIGURE 2 is a schematic illustration of the electrode of my invention being used for geological exploration.

FIGURE 2 illustrates the use of my electrode in geological exploration as described in copending application Ser. No. 444,250, "Electrohydraulic System for Geological Exploration," Matrone. Electrode 2 is lowered into a liquid filled hole 30 drilled into the earth's surface. Sealing of the hole by means of diaphragm 16 and the circulation of working fluid takes place in the same manner as discussed with respect to FIGURE 1. Shield 12 becomes especially useful in this application since, as aforementioned, it focuses the shock waves in the downward direction and thereby induces them to penetrate to a depth greater than the depth of hole 30, itself, before radiating outward from the axis of the hole. By directing substantially all of the shock waves in one direction, a greater concentration is achieved to thereby induce a significant amount to pass through the bottom of hole 30 before reflection begins. A shallow bore hole can then be used as effectively as a much deeper one. Since in drilling holes in the ground during geological exploration, especially oil exploration, the difficulty and cost mount substantially as the depth increases, my apparatus permits the use of a rather shallow hole with the same effective results as much deeper holes. Shock waves 40, thus as shown in FIGURE 2 penetrate to a depth much deeper than the bottom of shaft 30 before reflection begins. To produce equal results of reflection intensity, the hole would have to be at least as deep as point 41 in FIGURE 2 where the shock waves begin to radiate. Also, shielding permits the avoidance of substantial surface waves which travel along the surface of the ground and interfere with the shock wave readings received. After the shock waves pass through the earth strata being investigated, readings are received by suitable receiving means such as seismographs, or geophones (as described in the aforementioned application Ser. No. 444,250 to Matrone). A highly efficient way of transmitting electrohydraulic shock waves while operating in a relatively shallow hole is thus provided.

It is apparent from the foregoing that my invention attains the objectives set forth. Apparatus embodying my invention is sturdy in construction and well adapted for use in conjunction with various environments. Shock wave generation and transmission is accomplished in a highly efficient manner by effectively shielding the electrode and circulating known fluids in contact therewith.

While specific embodiments of my invention have been described, the invention is not limited thereto, since many modifications may be made by one skilled in the art and the appended claims are intended to cover all such modifications as fall within the true spirit and scope of my invention.

What I claim as new and desire to secure by Letters Patent of the United States is:

1. Apparatus for use with a shock wave emitter of an electrohydraulic system that is placed within a liquid filled hole in the ground comprising a flexible diaphragm, adapted to contain a fluid whose properties are known, which fluid and diaphragm surround the emitter so that substantially all shock waves emitted thereby pass through the fluid and the diaphragm to result in a more uniform emitted shock wave, and said diaphragm being adapted to expand by the application of pressure therein to seal the hole and thereby more effectively transmit the shock waves into the ground.

2. Apparatus for use with a shock wave electrode of an electrohydraulic system, that is placed within a liquid filled hole in the ground, for geological exploration comprising a flexible diaphragm adapted to contain a fluid whose properties are known and which diaphragm surrounds the electrode so that substantially all shock waves emitted thereby pass through the fluid and the diaphragm to result in a more uniform shock wave, and said diaphragm being adapted to expand by the application of pressure therein to seal the hole and thereby more effectively transmit the shock waves into the ground, and means for securing said diaphragm to the electrode and having therein apertures for admission of fluid into said diaphragm and out thereof and where the latter aperture also is adapted to exhaust gases formed from shock wave emission.

3. An apparatus for use with a shock wave electrode of an electrohydraulic system adapted to be inserted into a liquid filled hole in the ground comprising a flexible container, adapted to contain a fluid whose properties are known, which container is positioned so that substantially all shock waves emitted pass therethrough to make the emitted shock waves more uniform in intensity and said flexible container being also adapted to expand by application of pressure therein to seal said hole,
a shield connecting said container to the electrode to direct the emitted shock waves in a desired direction, and
means for admitting fluid into said container and discharging fluid and exhaust gases caused by shocking from said container.

4. An apparatus for use with an electrode for an electrohydraulic system adapted to be placed into a liquid filled bore hole comprising
a flexible diaphragm, adapted to contain a fluid whose properties are known, which diaphragm is positioned so that substantially all shock waves emitted by the electrode pass therethrough to make the emitted shock waves more uniform in intensity and adapted to expand and fill said bore hole laterally upon application of internal pressure,
a reflecting shield, connecting said diaphragm to said electrode, which partially surrounds said electrode so that the emitted shock waves are directed in a desired direction and apertures in said reflecting shield for admitting fluid into a container formed by said shield and said diaphragm and discharging fluid and exhaust gases caused by shocking from said container.

References Cited by the Examiner
UNITED STATES PATENTS

| | | | |
|---|---|---|---|
| 1,152,697 | 9/1915 | Bodde | 340—12 |
| 2,167,536 | 7/1939 | Suits | 340—12 |
| 2,559,227 | 7/1951 | Rieber | 128—24 |
| 2,846,019 | 8/1958 | Lang | 181—.5 |

CHESTER L. JUSTUS, *Primary Examiner.*

G. M. FISHER, *Assistant Examiner.*